United States Patent [19]

Green

[11] Patent Number: 4,636,047

[45] Date of Patent: Jan. 13, 1987

[54] WRIST WATCH MIRROR ACCESSORY

[76] Inventor: Ronald N. Green, 1723 W. Monterosa, Phoenix, Ariz. 85015

[21] Appl. No.: 842,777

[22] Filed: Mar. 21, 1986

[51] Int. Cl.$^4$ .......................... G02B 1/04; G02B 5/08; B32B 15/08; B32B 7/06

[52] U.S. Cl. ..................................... 350/641; 350/638; 350/587; 428/912.2; 428/458; 428/40; 428/687; 248/467

[58] Field of Search ............... 350/641, 642, 638, 631, 350/600, 627, 587; 428/912.2, 458, 40, 687, 624, 625, 626, 667; 248/467

[56] References Cited

U.S. PATENT DOCUMENTS

| | | | |
|---|---|---|---|
| 291,033 | 1/1884 | Couch | 350/638 |
| 1,309,150 | 7/1919 | Monfort | 350/638 |
| 1,453,671 | 5/1923 | Harrold | 350/638 |
| 2,501,211 | 3/1950 | Cummings | 428/912.2 |
| 3,020,188 | 2/1962 | Zompa | 350/641 |
| 3,410,636 | 11/1968 | Herrick | 350/641 |
| 3,505,040 | 4/1970 | Uchida et al. | 428/667 |
| 3,589,975 | 6/1971 | Andrews et al. | 428/458 |
| 3,681,180 | 8/1972 | Kent | 428/458 |
| 3,914,502 | 10/1975 | Hayashi et al. | 428/458 |
| 3,972,601 | 8/1976 | Johnson | 350/627 |
| 4,192,905 | 3/1980 | Scheibal | 428/912.2 |
| 4,287,266 | 9/1981 | Myles | 428/687 |
| 4,307,150 | 12/1981 | Roche | 428/458 |
| 4,329,396 | 5/1982 | Kropp | 428/458 |
| 4,489,110 | 12/1984 | Bier | 428/687 |

FOREIGN PATENT DOCUMENTS

| | | | |
|---|---|---|---|
| 580716 | 8/1959 | Canada | 428/458 |
| 2805960 | 10/1978 | Fed. Rep. of Germany | 428/458 |
| 585974 | 3/1925 | France | 350/638 |
| 560003 | 3/1957 | Italy | 428/458 |
| 251541 | 8/1948 | Switzerland | 350/638 |
| 1268110 | 3/1972 | United Kingdom | 248/467 |

Primary Examiner—Jon W. Henry
Attorney, Agent, or Firm—James H. Phillips; Charles E. Cates

[57] ABSTRACT

In order to provide a high quality mirror readily at hand for the emergency use of a contact lens wearer, an accessory mirror comprising a thin wafer having a mirrored outer surface is affixed to the back of a wrist watch. The presently preferred embodiment of the invention comprises a steel wafer shaped approximately to conform with the shape of the watch back. The steel wafer has a first surface which is mirror finished and chromium plated and a second surface coated with an adhesive layer which is itself overlayed by a paper wafer. Thus, the paper wafer is removable to permit affixing the steel wafer to the wrist watch back. A process for preparing the preferred embodiment of the product is disclosed. In addition, variants utilizing a plastic film sold under the trademark "Mylar" and coated with metal and incorporating a protective cover for the mirror surface are also disclosed.

11 Claims, 8 Drawing Figures

U.S. Patent   Jan. 13, 1987   4,636,047
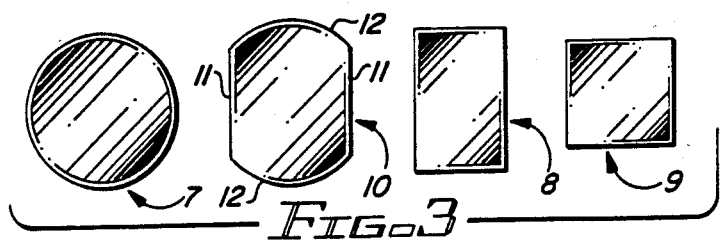
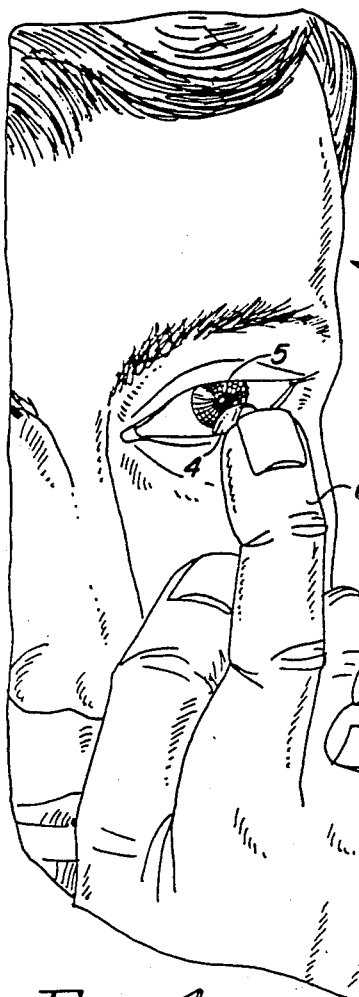
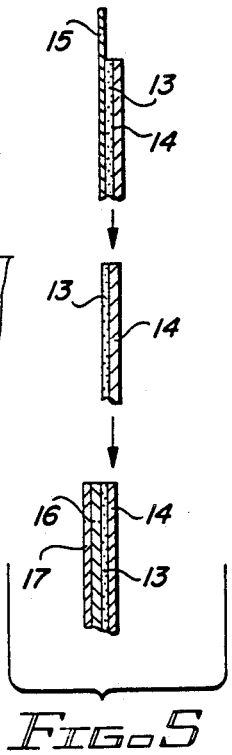
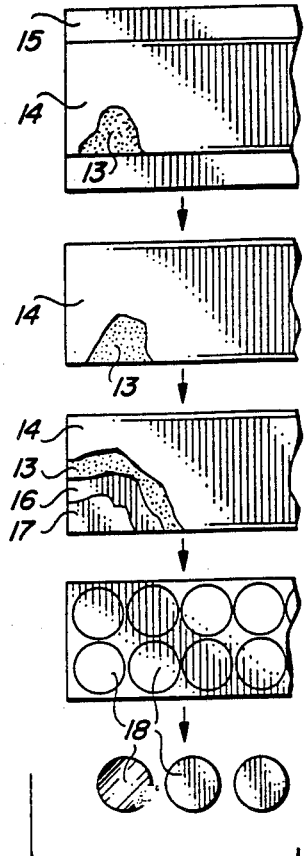
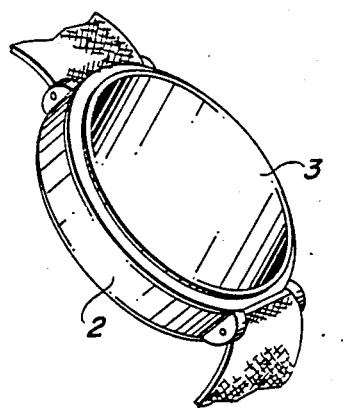
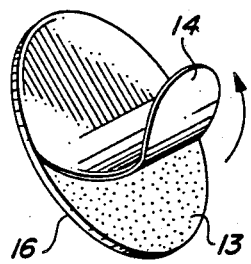
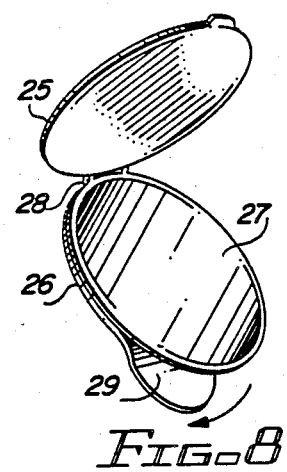
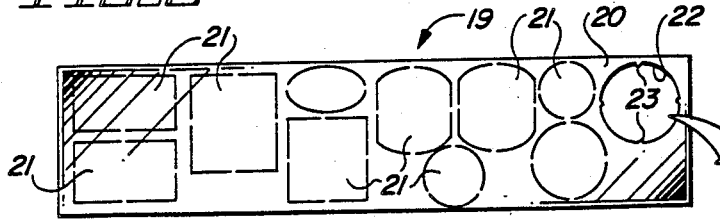

WRIST WATCH MIRROR ACCESSORY

FIELD OF THE INVENTION

This invention relates to the horology arts and, more particularly, to a mirror accessory adapted for attachment to the back of a wrist watch.

BACKGROUND OF THE INVENTION

Wearers of contact lenses are often presented with the problem of inserting or reorienting the position of a contact lens under less than ideal conditions. For example, as a result of a speck of dirt in the eye, a gust of wind, an inadvertent shift in the contact lens position away from longitudinal alignment with the iris or for any of many other reasons, a contact lens wearer may be faced with a necessity for reinserting or readjusting a contact lens without ready access to a mirror. Many contact lens wearers find that it is exceedingly difficult, even impossible, to perform this task without the aid of a mirror. Nevertheless, while female contact lens wearers may, for example, have a compact or other mirror at hand, most men and many women will ordinarily have no mirror whatsoever with them and may be situated without access to any mirror at all as would be the case, for example, while hiking, jogging, or otherwise engaged in outdoor activities.

Thus, those skilled in the art will appreciate that it would be highly desirable to provide means by which a high quality mirror is at all times readily available for the use of a contact lens wearer.

OBJECTS OF THE INVENTION

It is therefore a broad object of my invention to provide a high quality mirror that is routinely readily available to the wearer under virtually all conditions.

It is another object of my invention to provide such a high quality mirror in the form of an accessory affixed to the back of a wrist watch.

It is a more specific object of my invention to provide a high quality mirror which can be removably affixed to the back of a wrist watch employing an adhesive.

In another aspect, it is an object of my invention to provide a thin wafer having at least one mirrored surface with adhesive predisposed on the opposite surface to facilitate attachment of the wafer to the back of a wrist watch.

It is yet another object of my invention to provide a fabrication technique to prepare a small mirror for ready attachment to the back of a wrist watch.

SUMMARY OF THE INVENTION

Briefly, these and other objects of my invention are achieved by providing a thin wafer dimensioned and configured for emplacement on the back surface of a wrist watch, the wafer having its outer surface mirror finished. An adhesive coating overlays the inner surface of the wafer which itself is preliminarily overlaid with a removable paper cover. Thus, the paper cover may be peeled off the adhesive coating to permit pressing the thin wafer onto the back of a wrist watch with the mirror finished surface directly outwardly. Thereafter, in order to effect an emergency mirror to aid in inserting and/or adjusting a contact lens, the user need only remove his wrist watch from his wrist and hold it to his eye with one hand while manipulating the contact lens with the other hand.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 illustrates contact lens wearer adjusting his contact lens while utilizing the wrist watch accessory of the present invention as an emergency mirror;

FIG. 2 illustrates the back of a conventional wrist watch illustrating one embodiment of my emergency mirror accessory in position;

FIG. 3 illustrates an exemplary range of shapes which are particularly adapted for use on differently shaped wrist watch backs;

FIG. 4 illustrates a series of steps comprising the process by which a presently preferred embodiment of my emergency mirror accessory may be fabricated;

FIG. 5 is a series of cross sections illustrating the developing laminar structure of the presently preferred embodiment of my emergency mirror accessory during the steps of its fabrication, the three illustrations corresponding to the upper three illustrations of FIG. 4;

FIG. 6 illustrates a preparatory step which the user carries out in anticipation of affixing my emergency mirror accessory to the back of his wrist watch;

FIG. 7 illustrates a variant embodiment of my invention in which different materials are used with a correspondingly different fabrication technique; and FIG. 8 illustrates a distinct variant of my invention which includes an optional protective cover for the mirror surface.

DETAILED DESCRIPTION OF THE INVENTION

As shown in FIG. 1, with simultaneous reference to FIG. 2, a contact lens wearer 1 is shown using a wrist watch 2 which has been fitted on the back with my emergency mirror accessory 3 (FIG. 2) to adjust the position of an errant contact lens 4 in his eye 5 using his finger 6. It will be apparent from a study of FIG. 1 that the contact lens user 1 has removed the wrist watch 2 from his wrist for this purpose.

While the illustrated wrist watch 2 is of the common round back configuration, wrist watches with diversely shaped backs may be accommodated by the exemplary shapes for the mirror accessory illustrated in FIG. 3 and by such other shapes as may be appropriate to best fit the back of a given wrist watch. Thus, there is shown in FIG. 3 exemplary round 7, rectangular 8 and square 9 shapes and a shape 10 having straight long sides 11 and curved edges 12. It will therefore be understood that any shape appropriate to the back configuration of a given wrist watch may be accommodated by adjusting the planar shape of the mirror accessory.

The emergency mirror accessory is made available to the user with an adhesive layer protected by a removable paper wafer which is removed by the user prior to affixing the accessory to the back of his watch. The basic steps of the presently preferred process for manufacturing the mirror accessory are illustrated in FIGS. 4 and 5. Preliminarily, as shown in the uppermost illustration of each of FIGS. 4 and 5, a sheet of laminated material comprising an adhesive 13 sandwiched between a first paper layer 14 and a second paper layer 15 is obtained. A suitable laminated structure having these characteristics is commercially available from the 3M Company under the part number 3M-950 and from other sources. Next, as shown in the second illustration in each of FIGS. 4 and 5, the paper layer 15 is peeled away from one side of the adhesive 13. Then, as shown in the next lower illustration, a thin lamina of metal 16 is pressed against the adhesive surface previously exposed by the removal of the paper layer 15. The surface of the metal lamina 16 positioned away from the adhesive layer 13 has been previously polished or otherwise conventionally treated to obtain a mirror finish. In addition, the mirror surface is preferably plated with a protective layer of a hard and corrosion resistant material as exemplified by chromium plating layer 17. The preferred material for the metal lamina 16 is steel having a thickness falling within the range 0.015 to 0.030 inches.

After the laminated assembly has been prepared as described above, individual laminated units 18, such as the round units illustrated in the lower portions of FIG. 4, may be punched out using conventional punch and die apparatus. As punched, the individual units are ready for packaging and distribution to the end user.

As shown in FIG. 6, the end user need only remove the remaining paper layer 14 to again expose the adhesive layer 13 facing the back surface of the metal wafer 16 which has its other surface mirror finished. When the paper layer 14 is removed, the metal wafer 16 may simply be pressed against the back of a wrist watch surface to obtain the result illustrated in FIG. 2 for subsequent emergency use as depicted in FIG. 1.

While, for longevity, I prefer to employ a steel wafer having a polished and plated surface to effect the emergency mirror, a less durable, but less expensive and more versatile, alternative configuration is illustrated in FIG. 7. As shown in FIG. 7, a strip 19 of a plastic material, such as that sold under the trademark "Mylar", is provided with a mirrored upper surface 20. Plastic films sold under the trademark "Mylar" and coated with metal to provide a mirrored surface are commercially available. A paper backed adhesive strip as previously described is applied to the bottom surface (not shown) of the strip 19. Then, a diverse series of shapes 21 are partially punched from the strip 19, but not completely removed. More particularly, as illustrated at the position 22, small connecting pieces of the plastic material have been left in place as indicated by the nibs 23. This condition follows a simple removal of the round unit 24 from the position 22, an operation readily performed by pushing upwardly on the unit 24 to sever the material in the regions of the nibs 23. Subsequently, the paper layer on the underside of the unit 24 may be peeled off to permit affixing the wafer to the back of a wrist watch as previously described.

While this configuration of the emergency mirror is not as sturdy and long wearing as the plated steel wafer, it can be replaced as often as necessary and has the feature that the entire strip 19 may be sold as a unit to provide emergency mirrors for an array of watch sizes and shapes and to permit ready replacement as often as may be necessary.

FIG. 8 represents a more complex assembly which includes a thin lid 25 secured by a hinge 28 to a wafer 26 having a mirrored surface 27. A removable paper layer 29 may be peeled off to permit attachment of the assembly to the back of a wrist watch as previously described. The configuration illustrated in FIG. 8 enjoys the advantage that the mirrored surface 27 is completely protected against the effects of abrasion, body fluids, etc. which may serve to deteriorate the mirror surface over the long term.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. An accessory for the back of a wrist watch to effect an emergency mirror comprising:
    (A) a thin wafer dimensioned and configured for emplacement on the back surface of a wrist watch, said wafer having a first one of its surfaces mirror finished;
    (B) an adhesive coating overlaying a second surface of said wafer; and
    (C) a removable paper wafer overlaying said adhesive coating;
   whereby said paper wafer may be peeled off said adhesive coating such that said thin wafer may be pressed onto the back of a wrist watch with said mirror finished surface directed outwardly, said thin wafer thereafter remaining secured in place on the wrist watch back by said adhesive coating.

2. The wrist watch accessory of claim 1 in which said thin wafer comprises a plastic having at least one surface treated to effect a mirror surface.

3. The wrist watch accessory of claim 1 which further includes a protective wafer overlaying said mirror finished surface and hinged to said thin wafer such that said protective wafer may be pivoted away from said mirror finished surface when to permit access by a user.

4. The wrist watch accessory of claim 2 which further includes a protective wafer overlaying said mirror finished surface and hinged to said thin wafer such that said protective wafer may be pivoted away from said mirror finished surface when to permit access by a user.

5. The wrist watch accessory of claim 2 in which said plastic is "Mylar".

6. The wrist watch accessory of claim 3 in which said plastic is "Mylar".

7. The wrist watch accessory of claim 4 in which said plastic is "Mylar".

8. An accessory for the back of a wrist watch to effect an emergency mirror comprising:
    (A) a thin steel wafer dimensioned and configured for emplacement on the back surface of a wrist watch, said steel wafer having a first one of its surfaces polished;
    (B) a thin plating of a hard metal overlaying said polished surface of said steel wafer to effect a durable mirror finish thereon;
    (C) an adhesive coating overlaying a second surface of said steel wafer; and
    (D) a removable paper wafer overlaying said adhesive coating;
   whereby said paper wafer may be peeled off said adhesive coating such that said steel wafer may be pressed onto the back of a wrist watch with said polished surface directed outwardly, said steel wafer thereafter remaining secured in place on the wrist watch back by said adhesive coating.

9. The wrist watch accessory of claim 8 in which said thin plating constitutes chromium plating.

10. The wrist watch accessory of claim 8 in which the thickness of said steel wafer falls within the range 0.015–0.030 inches.

11. The wrist watch accessory of claim 9 in which the thickness of said steel wafer falls within the range 0.015–0.030 inches.

* * * * *